June 7, 1966 N. S. KAPANY ETAL 3,255,357

PHOTOSENSITIVE READER USING OPTICAL FIBERS

Filed Aug. 15, 1962 2 Sheets-Sheet 1

INVENTORS
Narinder S. Kapany
BY David F. Capellaro
Townsend and Townsend
Attorneys

PHOTOSENSITIVE READER USING OPTICAL FIBERS

INVENTOR.
Narinder S. Kapany
David F. Capellaro
BY
Townsend and Townsend
attorneys United States Patent Office 3,255,357

Patented June 7, 1966

3,255,357
PHOTOSENSITIVE READER USING OPTICAL FIBERS

Narinder S. Kapany, Woodside, and David F. Capellaro, Palo Alto, Calif., assignors to Optics Technology, Inc., a corporation of California Filed Aug. 15, 1962, Ser. No. 217,198
2 Claims. (Cl. 250—227)

This invention relates to an optical reader for converting graphical information into a form that can be directly utilized by data processing equipment.

In machine handling of information it is often necessary to translate graphs such as those obtained from measuring instruments into a form which can be utilized for processing in a data processing machine. Such graphs usually find their derivation from devices in which a line representation of a particular physical phenomenon is continually drawn on a sheet of paper. The height of the line relative to a given datum on the paper generally indicates a change of value of the particular phenomenon being observed and recorded. Such information can be recorded directly by inking a mobile sheet or can be recorded photographically or by other means. Although such graphs are visually informative it is extremely difficult to convert these forms of data into machine language.

One of the principal objects of this invention is to provide an optical reader which can periodically read the graph and convert graphic designations thereon into voltages, pulses or other machine readable phenomena so that the data can be processed and analyzed in data processing equipment.

A further object of this invention is to provide in such a device an apparatus which will accurately and with great speed reduce graph information into machine form. It is obvious in such reduction of information that both speed and accuracy are of critical importance.

While there have been devices in the past that have been able to translate such information, such devices have been either unreliable in their results or are inherently slow in conversion.

One of the features and advantages of this invention lies in the fact that the original graph taken from a recording device can be optically analyzed and the information thereon converted into electrical values which are either digitally or in an analogue relationship directly correlated to the indicated value on the graph.

The device therefore also has the feature and advantage of not requiring a physical modification or alteration of the graph itself during or prior to the reading process.

Another object of this invention is to provide a novel optical system in which a plurality of discrete beams of light with extremely small dimension are projected on the face of an area to be read. Each spot of light is then transmitted from the graph to separate light detecting devices which can convert the light value from each beam into an electrical signal.

Another feature and advantage of this invention lies in the fact that the apparatus is capable of uniformly sampling the area of a record sheet to determine the precise location at which a marking occurs. Each sample is at a known location so that an electrical signal derived from a sampled light beam uninterrupted by a mark is in a specific and known relationship to the position of the marking on the record sheet.

Still another object of this invention is to provide a plurality of light transmitting fibers arranged to project light onto a target area and to provide a similar array of light receiving fibers in which each receiving fiber is aligned to receive light from the record bearing medium transmitted to the medium by a selected one of the light transmitting fibers in the light transmitting array of fibers.

Still another feature and advantage of this apparatus lies in the fact that each light receiving fiber is adapted to receive light from only a preselected light transmitting fiber. Because of this feature photo-cells arranged to respond to the light transmitted by each of the receiving fibers are capable of producing electrical signals which bear a specific relationship to the optical characteristics of the record medium for each sampling spot. The accuracy of the system is therefore determined only by the number of sensing spots used. Thus the system is capable, by virtue of the selection of the number of sensing spots, to obtain virtually any degree of resolution or accuracy desired.

A feature and advantage of this invention lies in the fact that light receiving fibers can be arranged in a predetermined pattern so that any light received by a fiber bears a specific geometric relationship to the optically visible pattern on the record medium. Thus the light from each of the receiving fibers can be converted by a photo-transducer into an electrical signal which will correspond to the geometric relationship of the optical indicia on the record.

Other objects of the present invention will become apparent upon reading the following specification and referring to the accompanying drawings in which similar characters of reference represent corresponding parts in each of the several views.

Figure 1:
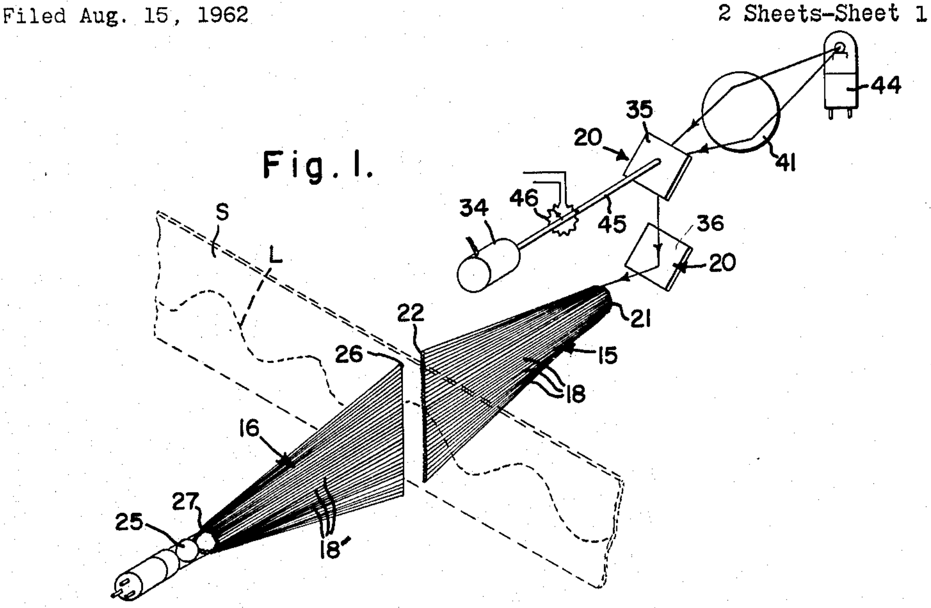
FIG. 1 is a diagrammatic perspective of a preferred embodiment of the invention.

Referring now to the drawings and with particular reference to FIG. 1 there is provided a graph paper S. The graph paper is provided with means to move the paper in a linear path (not shown). Such means may include the conventional type of devices used for moving strip material past a sensing station, such as for example those systems conventionally used to move tape past a sensing or reading station.

Graph paper S may contain one or a plurality of indicia bearing lines such as indicated at L which are indicative of previously recorded phenomena.

Tape L is formed of transparent or translucent material so that light transmitted towards one face of the strip will pentrate the strip and be projected out the opposite side. Generally conventional paper used for recording graphs is adequate for this purpose.

The reading station comprises a photo projection matrix 15 and a photo receiving matrix 16. Both the receiving and the projection matrices 16 and 15 respectively comprise a bundle of light transmitting fibers in which respective fibers of the projection and receiving matrices are aligned so that the maximum transmission of light from a selected fiber of the photo projection matrix will be projected onto a selected fiber of the receiving matrix.

The fibers generally indicated at 18 are made of glass or other transparent material having a relatively high index of refraction, which are surrounded with a coating having a low refractive index. Such fibers will transmit a high percentage of light from one end of the fiber to the other even though the fibers may be bent or twisted at various selected angles.

The fibers used are described generally in the article by Narinder S. Kapany entitled "Fiber Optics" in the November 1960 issue of Scientific American at pages 72–81.

In the embodiment of FIG. 1 a light scanning system 20 is arranged to sequentially shine light onto the input ends 21 of the fibers 18 of the photo projection matrix. The output end 22 of the photo projection matrix is arranged in a linear or curvilinear pattern so that the circular scan of light from light projection system 20 will progressively appear in lineal relationship on the ends of fibers 18 in output end 22 of the projection matrix.

A photo receiving matrix 16 is arranged with the input ends 26 of its fibers 18' in substantially axial alignment with fibers of matrix 15 so that when light is projected from each fiber 18 of the projection matrix it will shine directly through the tape onto an axially aligned fiber 18' of the photo receiving matrix.

The output end 27 of the photo receiving matrix is arranged to illuminate a photo electric cell 25.

Photo receiving matrix 16 is constructed so that the input end 26 is arranged in a linear pattern generally arranged transverse to the axis of movement of the tape through the reading station. The output end is arranged in a cluster in such a way that the ends of each of the fibers are in substantially equal light transmitting relationship to the photo sensing unit of photo cell 25.

The light transmitting qualities of each of the fibers in photo receiving matrix 16 are such that light of equal intensity reaching input end 26 of any of the fibers 18' will provide light on photo cell 25 of equal intensity. Because of this factor an equal light source shining on any of the input ends 26 of photo receiving matrix 16 will provide an electrical power output from the photo cell of equal value.

Figure 2:
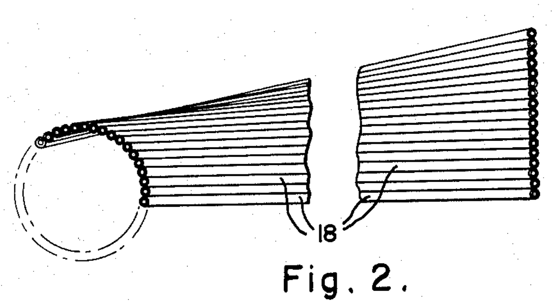
FIG. 2 is an enlarged diagrammatic view showing the array of fibers in the device as shown in FIG. 1.

Photo projection matrix 15 has its output end also arranged in a linear pattern and its input end is arranged, as shown in FIG. 2, in circular configuration with the various fibers being positioned so that the circular pattern is in correlation to the linear pattern on the output end of the matrix. Thus by providing a rotating scan around the input end 21 of the photo projection matrix there will be a linear scan down the output end 22. Output end 22 thus provides a series of discrete pulses occurring in a linear pattern transverse to the longitudinal or moving axis of the tape and in precise registration with ends 26 of the fibers of the photo receiving matrix.

The fact that the output end of each of the fibers 18 of the projection matrix is in the maximum light transmitting relationship to a corresponding fiber of the photo receiving matrix provides a highly controlled scan or swep of maximum registration. Thus a line or marking L on the tape will prevent the transmission of a substantial portion of the light from a particular fiber of the projection matrix to a particular fiber of the receiving matrix. Because the fibers of the projection matrix are in a specific physical relationship to the position of the tape it is apparent that the lesser light intensity transmitted to the particular fiber will be in direct correlation to the position of the marking L on the tape.

The pin point of pulsed light from the projection matrix provides a light transmitting resolution which provides for extreme accuracy in the light transmission to the photo receiving matrix. Thus any particular fiber will be affected only by light received from a particular fiber in the photo projection matrix and will not be affected by light coming from any other fiber in the projection system.

Figure 3:
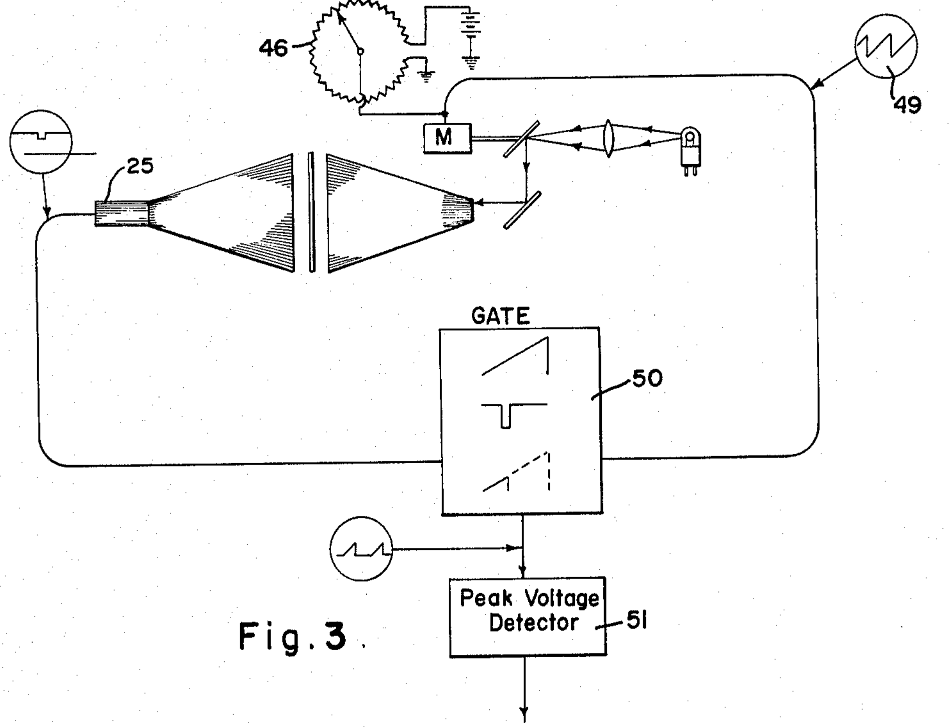
FIG. 3 is a block diagram illustrating the electronic logic used in conjunction with the embodiment of FIG. 1.

In order to utilize the information gained from the reception of light by the photo receiving matrix a timing pulse is generated by light scan 20 which is synchronized with the scan of the photo projection matrix. Such timing pulse in the embodiment of FIGS. 1–3 is generated, by use of suitable conventional elements, as the voltage developed at the output of potentiometer 46 returns to zero. Thus the voltage or current output from photo cell 25 in reference to the timing or synchronizing signal from light scan 20 provides information which can be converted to provide a direct reference to the position and light transmitting qualities of any marking of greater opaqueness on tape S. Light scan 20 forms a scan by providing a motor 34 which is arranged to rotate a pair of mirrors 35 and 36 in such a manner as to cause a light beam to be projected sequentially around a circular pattern on input end 21 of the photo projection matrix.

Mirrors 35 and 36 are arranged to receive light from a light source 44 and to project the light onto the mirrors through a lens system 41. The mirrors reflect the light through one complete revolution of the circular array at end 21 of the photo projection matrix.

A shaft 45 connects motor 34 to mirror 35 and is arranged to rotate a continuous potentiometer 46. The potentiometer is arranged to go from a zero value when the beam is in a position to be projected from the top fiber of output end 22 of the photo projection matrix, and to be at a maximum value when the beam is in the lower end of the output end.

The voltage output from potentiometer 46 thus provides an analogue voltage which is an analogue of the scan beam position. The output of the potentiometer 46 appears as a saw-toothed wave as indicated at 49 in FIG. 3.

The output from potentiometer 46 and from photo cell 25 can be compared, for example by the use of a comparison and gating circuit 50. Gating circuit 50 comprises conventional electronic components in which the gate is arranged to pass signals from potentiometer 46 to a peak voltage indicator 51 so long as the output from photo cell 25 remains at a certain level. Exemplary electronic components constituting gating circuit 50 are disclosed in detail in McGraw-Hill Encyclopedia of Science and Technologly (1960), volume 13, page 344, et seq. However, when the output falls below a predetermined level, as when the light beam is blocked by a marking on the graph L, gate 50 will be gated off. Thus the peak voltage value passing through gate 50 will be an analogue of the position of mark L on graph S.

Integrating and shaping circuits may be desirable from the output of photo cell 25 in order to compensate for the time interval between adjacent fibers. Of course, the gate is arranged to be again opened each time the potentiometer reaches its zero value. Peak voltage indicator 51 will therefore provide a series of voltage values, each value being an analogue of the position of line L relative to a datum line (such as one edge of tape S) on the graph.

It can thus be seen that there will be a continual transverse scan of the tape as the tape is moved past the sensing station. The appearance of a light inhibiting marking on the paper during each scan will give an indication of a voltage which is indicative of the position of the marking relative to a datum or reference line on the tape. These voltage readings are therefore analogous of the position of the line on the tape which can be directly fed to the input of a data processing device.

Figure 4:
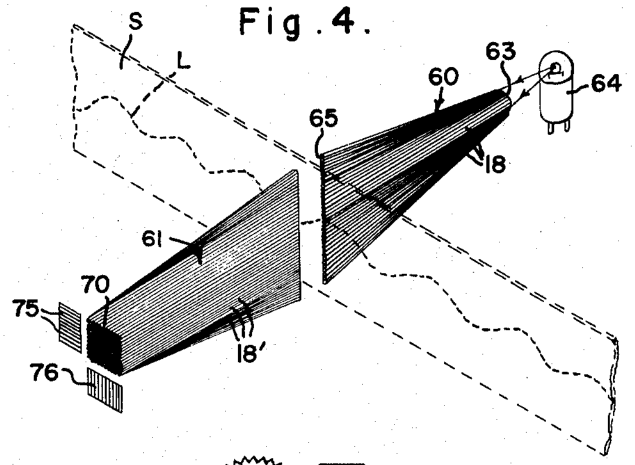
FIG. 4 is a schematic of another embodiment of the invention.

The arrangement of FIG. 4 is a modification of the device shown in FIG. 2, but providing a digital output in which the appearance or lack of appearance of a signal on particular lines is in direct correlation to the presence of a marking on a tape S.

The device of FIG. 4 employs an identical tape transport as that discussed in relation to FIG. 1 in which a tape S with graphic illustrations L is drawn past a sensing station.

In the device of FIG. 4 a photo projection matrix 60 is arranged with the fibers of its input end 63 arranged in a cluster equally spaced from a lamp 64 so that an equal amount of light will fall on the terminal ends of each of the fibers of the photo projection matrix 60. The output ends 65 of the photo projection matrix are arranged in a linear pattern in the same manner as that discussed in FIG. 1.

Immediately opposite photo projection matrix 60 a photo receiving matrix 61 is arranged having its input end immediately facing output end 65 of photo projection matrix 60.

Just as in the preceding embodiment each fiber within photo receiving matrix 61 is aligned to receive light from one fiber in photo projection matrix 60.

Exemplary of techniques for developing a signal indicative of which fiber in photo receiving matrix 61 is excited, the output end 70 of the photo receiving matrix is arranged in a coincidence type matrix generally arranged with the terminal ends of the fibers in parallel rows so that they in effect provide rows and columns. Each of the rows can be sensed by a column of photo detector 75 and each of the columns is sensed by a row of photo detectors 76. Thus by this means 100 fibers can have their terminal ends arranged in a ten-by-ten matrix. Such a system would require ten column sensing photo devices and ten rows sensing photo devices.

The output from the two photo devices can be employed in coincidence circuits, as conventionally used, to provide an output correlated to any particular position in the matrix. Thus the presence of any line L or plurality of lines on tape S will cause one or more of the fibers in the receiving matrix to have a lower intensity of light than the remainder of the fibers. This would be sensed by the aligned vertical and horizontal photo sensing cells 75 and 76 respectively. Such a signal variation would be a digital equivalent to the position of the line or lines relative to the tape.

Figure 5:
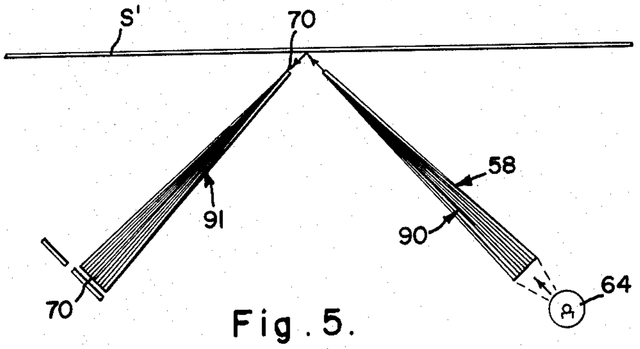
FIG. 5 is a diagrammatic view of still another embodiment of the invention.

In FIG. 5 there is provided an alternate embodiment of the invention which may employ either the analogue representation, as shown in FIG. 1, or the digital representation, as shown in FIG. 4, but is applicable particularly for use with tapes S' which are generally opaque and which the line L has a different light reflecting characteristic than the main body of the tape.

In the embodiment of FIG. 5 the light transmitting matrix 90 is arranged to project the light directly on the front face of tape S'. The light receiving matrix 91 is arranged to pick up light projected on the tape. The projection matrix and the receiving matrix 90 and 91 respectively are arranged at angles for maximum reflection from the light transmitting matrix to the light receiving matrix and the fibers within each of the matrices are so aligned so that the fiber in the receiving matrix is aligned for receipt of light only from one selected fiber in the light transmitting matrix. Thus the device of FIG. 5 operates in the same way as the device of FIG. 1 or alternatively the device of FIG. 3 by reflection rather than light transmission through the tape.

Although in the foregoing, the fiber layers have been shown in almost immediate contact with the data bearing tape, it is believed that similar results can be achieved optically by placing suitable lenses between the fiber ends of the data bearing tape. These and other details have been shown by way of illustration and example for purposes of clarity of understanding, it is understood that certain changes and modifications may be practiced within the spirit of the invention as limited by the scope of the appended claims.

We claim:

1. An optical reader for sensing an indication of the presence and location of a marking on an indicia bearing surface comprising a light transmitting matrix composed of a plurality of diminutive light transmitting fibers, the input end of said light transmitting fibers disposed in a regular configuration, the output end of the fibers of the light transmitting matrix being arranged to project light in a linear pattern on the indicia bearing surface, light source means positioned to project light of equal intensity on each of the input ends of the fibers of said transmitting matrix, said light source means including a point light source and means to continually project said point light source successively on the input of each fiber of the light transmitting matrix, a light receiving matrix composed of an equal plurality of diminutive light transmitting fibers having the input end of each fiber disposed in precise axial alignment with the output end of a unique complementary fiber of the light transmitting matrix to receive light from the indicia bearing surface projected from the output end of only the complementary fiber of the light transmitting matrix, photo sensing means disposed to be energized by light output from the output end of said light receiving matrix, timing means responsive to the position of said point light source, and means to integrate the output of the photo sensing means and said timing means to determine the time relation therebetween, whereby said photo sensing means will produce an output signal corresponding to the light transmitting properties of said indicia bearing surface.

2. An optical reader for sensing an indication of the presence and location of a marking on an indicia bearing surface comprising a light transmitting matrix composed of a plurality of diminutive light transmitting fibers, the input end of said light transmitting fibers disposed in a regular configuration, the output end of the fibers of the light transmitting matrix being arranged to project light in a linear pattern on the indicia bearing surface, light source means positioned to project light of equal intensity on each of the input ends of the fibers of said transmitting matrix, a light receiving matrix composed of an equal plurality of diminutive light transmitting fibers having the input end of each fiber disposed in precise axial alignment with the output end of a unique complementary fiber of the light transmitting matrix to receive light from the indicia bearing surface projected from the output end of only the complementary fiber of the light transmitting matrix, photo sensing means disposed to be energized by light output from the output end of said light receiving matrix and including gating means wherein said photosensing means is arranged to produce discrete separately identifiable output in response to the light output end of each fiber of the light receiving matrix, whereby said photo sensing means will produce an output signal corresponding to the light transmitting properties of said indicia bearing surface.

References Cited by the Examiner

UNITED STATES PATENTS

| | | | |
|---|---|---|---|
| 2,256,595 | 9/1941 | Metcalf | 250—227 |
| 2,309,117 | 1/1943 | John | 250—227 X |
| 2,967,664 | 1/1961 | Ress | 250—227 X |
| 2,982,175 | 5/1961 | Eisler | 250—227 X |
| 3,150,356 | 9/1964 | Newman | 88—1 |

RALPH G. NILSON, *Primary Examiner.*

WALTER STOLWEIN, *Examiner.*